United States Patent [19]
Bongaerts et al.

[11] Patent Number: 5,696,569
[45] Date of Patent: Dec. 9, 1997

[54] CHANNEL CONFIGURATION FOR PLASMA ADDRESSED LIQUID CRYSTAL DISPLAY

[75] Inventors: Petrus Franciscus Gerardus Bongaerts, CS Waalre; Jacob Bruinink, DC Eindhoven; Adrianus Leonardus Josephus Burgmans, KA Eindhoven; Henri Roger Jules Richard van Helleputte, BW Eindhoven, all of Netherlands; Babar Ali Khan, Ossining, N.Y.; Karel Elbert Kuijk, MR Dommelen, Netherlands; Thomas Stanley Buzak; Kevin John Ilcisin, both of Beaverton, Ohio; Paul Christopher Martin, Vancouver, Wash.

[73] Assignees: Philips Electronics North America, New York, N.Y.; Tektronix, Inc., Wilsonville, Oreg.

[21] Appl. No.: 361,078

[22] Filed: Dec. 21, 1994

[51] Int. Cl.$^6$ .............. G02F 1/1343; G09G 3/20; G09G 3/28
[52] U.S. Cl. .............. 349/143; 349/110; 345/58; 345/60
[58] Field of Search .............. 359/54, 87, 67; 345/60, 58; 313/582; 349/143, 139, 110

[56] References Cited

U.S. PATENT DOCUMENTS

| | | | |
|---|---|---|---|
| 4,896,149 | 1/1990 | Buzak et al. | 340/794 |
| 5,077,553 | 12/1991 | Buzak | 340/794 |
| 5,244,427 | 9/1993 | Umeya | 445/24 |
| 5,272,472 | 12/1993 | Buzak | 345/60 |
| 5,276,384 | 1/1994 | Martin | 313/582 |
| 5,311,204 | 5/1994 | Nishida | 345/60 |
| 5,351,144 | 9/1994 | Tanamachi | 359/54 |
| 5,400,046 | 3/1995 | Ilcisin et al. | 345/58 |
| 5,408,245 | 4/1995 | Kakizaki | 345/60 |
| 5,414,440 | 5/1995 | Ilcisin et al. | 345/60 |
| 5,420,707 | 5/1995 | Miyazaki | 359/54 |
| 5,434,688 | 7/1995 | Saitoh et al. | 359/67 |
| 5,440,201 | 8/1995 | Martin et al. | 345/60 |
| 5,499,122 | 3/1996 | Yano | 359/54 |
| 5,523,770 | 6/1996 | Tanamachi | 345/60 |
| 5,568,291 | 10/1996 | Murata et al. | 359/67 |

FOREIGN PATENT DOCUMENTS

| | | |
|---|---|---|
| 0566997 | 10/1993 | European Pat. Off. |
| 0567021 | 10/1993 | European Pat. Off. |

OTHER PUBLICATIONS

Buzak et al, "A 16–Inch Full Color Plasma Addressed Liquid Crystal Display", Digest of Tech. Papers, 1993 SID Int. Symp., Soc. for Info. Disp. pp. 883–886.

*Primary Examiner*—William L. Sikes
*Assistant Examiner*—Toan Ton
*Attorney, Agent, or Firm*—John C. Fox

[57] ABSTRACT

A plasma-addressed electro-optic display device comprising a layer of electro-optic material, data electrodes coupled to the electro-optic layer and adapted to receive data voltages for activating portions of the electro-optic layer, and a plurality of plasma channels extending generally transverse to the data electrodes for selectively switching on said electro-optic portions. The plasma channels each comprise spaced elongated cathode and anode plasma electrodes and an ionizable gas filling. To improve performance and increase the effective aperture and provide a stable discharge, the channels are configured with a substantially flat bottom surface portion and curved side wall surface portions on which the electrodes are deposited such that the spacing between the electrodes is increased and the electrode surfaces form an angle of the order of 90°. Additional features include provision of black masking to screen out incident light that may depolarize, and a novel method of forming the electrodes using a single mask.

14 Claims, 3 Drawing Sheets

CHANNEL CONFIGURATION FOR PLASMA ADDRESSED LIQUID CRYSTAL DISPLAY

RELATED APPLICATIONS

1) Commonly-assigned application, Ser. No. 08/407,536, filed Mar. 30, 1995, in the names of the same applicants (allowed Sep. 13, 1996).

BACKGROUND OF INVENTION

This invention relates to plasma-addressed liquid crystal display panels commonly referred to as "PALC" display devices. These devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns each of which is filled with a low pressure ionizable gas, such as helium, and containing spaced cathode and anode electrodes along the channel for ionizing the gas to create a plasma, which channels are closed off by a thin tOransparent insulator; and an electro-optic material such as a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is unnecessary because the construction, fabrication, and operation of such PALC devices have been described in detail in the following U.S. patents, EP patents, and publication, the contents of which are hereby incorporated by reference: U.S. Pat. Nos. 4,896,149; 5,077,553; 5,272,472; 5,276,384; EP 0 566 997 A1; EP 0 567 021 A1; and Buzak et al., "A 16-inch Full Color Plasma Addressed Liquid Crystal Display", Digest of Tech. Papers, 1993 SID Int. Symp., Soc. for Info. Displ. pp. 883–886.

The ideal plasma channel would allow the plasma to be established over the entire length of the channel in a short time (plasma formation time) and at low voltages. At the same time, the ideal channel would allow the plasma to be maintained for a certain time, after the ionizing voltage has been switched off, in a sufficiently conductive state so as to allow time for the pixel capacitance to charge up to the data signal voltage to be acquired by the liquid crystal pixel (data setup and capture time). After this time, the plasma must become non-conducting after a certain time (plasma decay time), so that the-pixel voltage does not change after the data line is switched off. According to the present state of the technology, the ideal case would require the plasma to be established over the length of the channel and remain in enough of a conducting state to allow the data to be written on the LC pixels in less than one-half the maximum available row address time. After that the plasma must become non-conducting. This allows the rest of the line time to be used for available crosstalk reduction techniques.

The present state of the art knowledge in PALC panels is that the height of the channel has to have a certain value, specifically, the height b of the channel has to be at least 75% of the spacing d between the metal lines constituting the plasma electrodes in order to obtain a stable discharge. This applies for a channel geometry in which the metal lines are parallel on a nearly flat surface. See EP 0 566 997 A1. It is also known for a different geometry in which the channel side walls are upright parallel to one another that, when the two parallel metal lines face each other on the opposed side walls, then the height h can be much lower, but still has to be at least 25% of the spacing d to obtain a stable gas discharge. See EP 0 567 021 A1.

If it is desired to provide plasma channels with a small pitch p, and to place the electrodes on a flat surface of the channel, the etching time for the channels will be short but the channel height h then is too low to maintain a stable gas discharge. Moreover, too small an optically effective pixel area, commonly referred to as the "aperture" or "aperture ratio" is then obtained. The "aperture" is the ratio of the visible part of the LC pixel to the overall size of the pixel. For example, for a 21-inch workstation panel with, say, (1280×3) columns (1 per color) and 1024 rows, and with a channel pitch p=312.5 µm, a height h=100 µm, and electrode widths w=50 µm, the interelectrode spacing d=100 µm. This limits the effective Usable width percentage to 100/312.5× 100=32%. With an ITO column pitch, p, of 111 µm, a black mask (surround) overlap of 5 µm (to avoid crosstalk), and an ITO column width, w, of 86 µm, the effective pixel area or aperture is only 21.9%, which is too small.

SUMMARY OF INVENTION

An object of the invention is an improved PALC display device.

Another object of the invention is a PALC display device having a larger optically effective pixel area, and providing a stable gas discharge.

In accordance with a first aspect of the invention, a PALC display device comprises shallow plasma channels each with a substantially flat bottom part and angled or curved sides, with the cathode and anode electrodes disposed on the angled or curved sides. An advantage of this construction is that a larger aperture results which increases the display brightness.

In accordance with a preferred embodiment of this aspect of the invention, the electrodes are arranged so as to form an angle of substantially 90° with respect to one another. This construction allows the interelectrode spacing to be increased, and the channel height to be lowered while yet providing a stable discharge.

In accordance with further aspects of the invention, a PALC display device is characterized in that each channel has a cross-section comprising a substantially flat bottom portion having a width c, curved or angled sides flanking the flat bottom portion and rising to a height h forming ridges between adjacent plasma channels of a width b, adjacent plasma channels having a pitch p, said plasma electrodes each having a width w and being spaced by a width d, the values of c, h, b, p, w and d being such that:

(i) $0.03\,p \leq b \leq 0.1\,p$ (ii) $0.28\,p \leq h \leq 0.34\,p$ (iii) $0.1\,p \leq w \leq 0.25\,p$ (iv) $0.6\,p \leq d \leq 0.75\,p$ In a preferred embodiment in accordance with the second aspect of the invention, each of the electrode surfaces form an angle $\phi$ with the substantially flat bottom surface portion, in which the angle $\phi$ is in the range of 40°–60°.

In accordance with still another aspect of the invention, black masking is provided in a configuration that screens light from being incident on side walls of the channels that can lead to depolarization amd loss of contrast.

In accordance with still a further aspect of the invention, a novel method is described for providing the electrodes on the side walls with use of only a single mask for patterning the electrode film.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
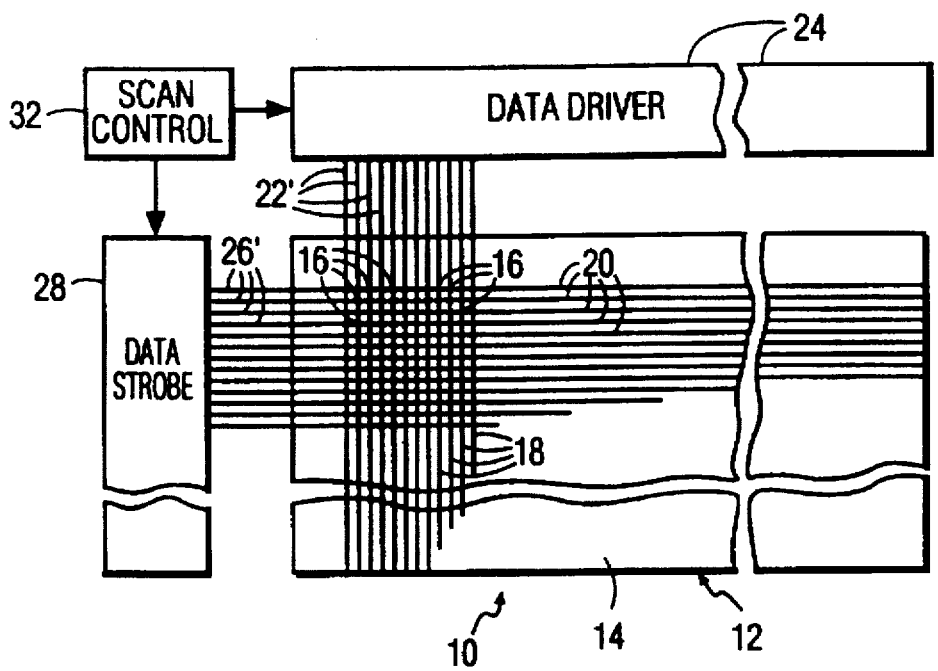
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34, and the channel rows are usually built into a second transparent substrate 36. Skilled persons will appreciate that certain systems, such as reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
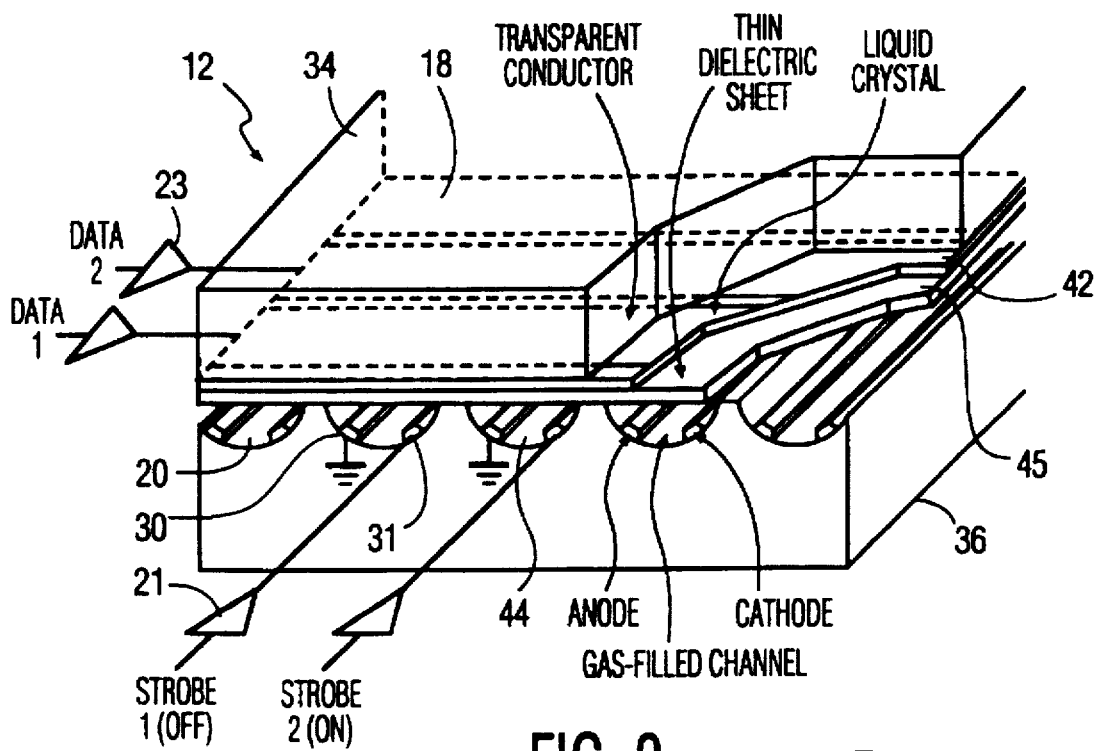
FIG. 2 is a perspective view of part of a conventional PALC display device.

FIG. 2 illustrates the PALC version of such a display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the anode. The second electrode 31 is called the cathode, because to it will be supplied relative to the anode electrode a negative strobe pulse sufficient to cause electrons to be emitted from the cathode 31 to ionize the gas. As explained above, each channel 20, in turn, has its gas ionized with a strobe pulse to form a plasma and a grounded line connection to a row of pixels in the LC layer 42 above. When the strobe pulse, terminates, and after deionization has occurred, the next channel is strobed and turned on. Since the column electrodes 18 each cross a whole column of pixels, only one plasma row connection at a time is allowed on to avoid crosstalk.

Figure 3:
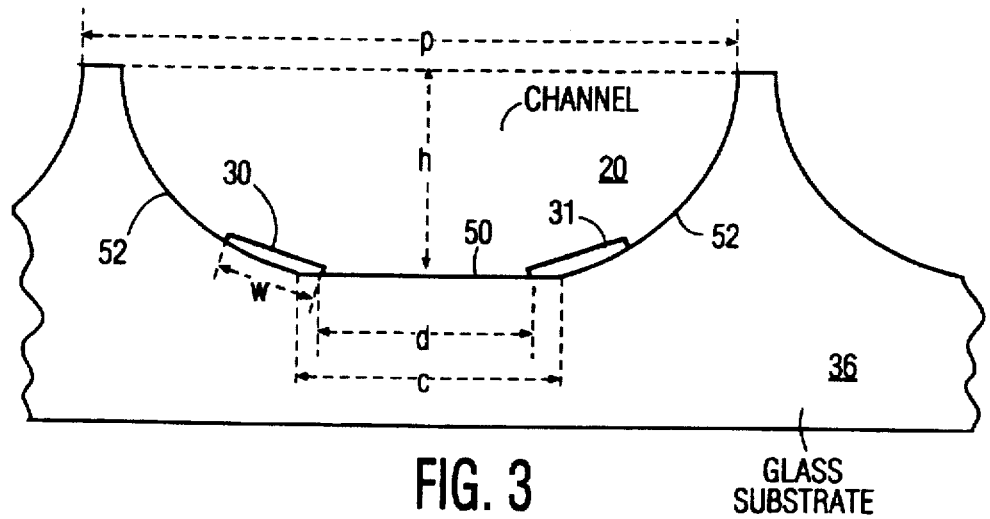
FIG. 3 is a cross-section of a one form of a channel of a PALC display device in accordance with a feature of the invention.

FIG. 3 illustrates just a substrate portion of a PALC display device containing channels 20. The substrate 36, typically of glass, has the channels 20, etched as described in the referenced patents and publication, and the anode 30 and cathode 31 electrodes are typically vapor deposited on the channel surfaces.

The typical prior art channel configuration was hemicylindrical with electrodes on the curved flanking side surfaces, or with a flat bottom portion with electrodes on flanking right angle, upright side wall surfaces. Both configurations, as described above, lead to unsatisfactory results.

In accordance with a feature of the invention, the channel height is reduced by a channel configuration comprising, as shown in the example of FIG. 3, a substantially flat bottom surface part 50 and curved flanking side wall surfaces 52. As described above, the channel pitch is p, the channel height is h, the width of the electrodes is w, the interelectrode spacing is d, and c is the width of the flat bottomed part 50. As will be noted, the electrodes 30, 31 begin just before where the curved side walls start to curve. However, with the typical dimensions described above, as indicated, the aperture is not optimal.

Figure 4:
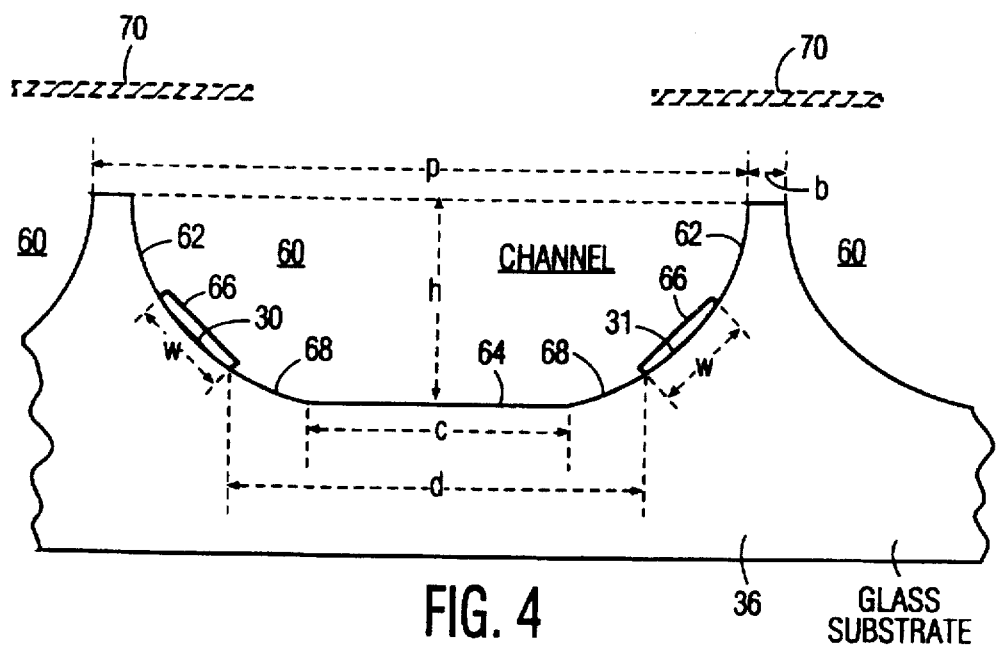
FIG. 4 is a cross-section of a channel of another form of a PALC display device in accordance with the invention.

Improved results cam be obtained, in accordance with a feature of the invention, when the channel 60 configuration is changed to that illustrated in FIG. 4 wherein the spacing d between the anode 30 and cathode 31 electrodes is increased by widening the flat bottom surface part 64 so that the electrodes are relocated further up on the curved surface parts 62 of the channel. The place on the side wall surfaces 62 of the metal lines 30, 31 representing the electrodes is chosen so that the electrode surfaces 66, if extended downward, will each form an angle of about 40°–60°, preferably 45°, with outward extensions of the flat part 64 of the bottom surface (i.e., with a horizontal surface), and thus an angle between the surfaces of the order of 90°. This results in a much larger optically effective pixel area. With a value for d=200 μm, an aperture of 200/312.5 * 76/111 * 100=43.8% is obtained, which is a very significant improvement over the previous constructions and quite acceptable for active-matrix LCDs.

Moreover, in accordance with a further feature of the invention, it is possible to screen the curved parts of the channels adjacent the curved side walls 62 with a black mask or surround to prevent polarized light from reaching those parts, as it is in those curved parts that light depolarization takes place. It will be appreciated that one form of conventional LCD panel includes a polarizer (not shown) for the incoming light, and the LC material attenuates the polarized light in response to applied voltage by rotating its plane of polarization to allow selective interception by an output polarizer (not shown). With such displays, when the polarized light reflects from the curved surfaces, it depolarizes and thus is not properly controlled by the output polarizer. In accordance with a further feature of the invention, black masking is used to prevent light from being incident on the channel side walls of adjacent channels at least between the respective nearest electrodes of the adjacent channels. FIG. 4 shows in dashed lines where black masking 70 can be provided along the full length of the channel to screen the ridges and the curved parts of the channel 60-including at least the wall portions 62—which will reduce undesirable light depolarization and increase the contrast of the display. This feature takes advantage of the extended width d of the channel bottom part which means that the effect on the aperture size is minimal. As explained in the cited 1993 SID digest paper, black masking for the channel ridges and color filter elements is typically provided on the substrate 34 after formation of the ITO electrodes and the color filter processing. Hence, the black masking 70 shown in FIG. 4 can also be applied in the same way. However, it will be understood that the masking 70 can also be provided if desired on the thin dielectric sheet 45.

Figure 5A:
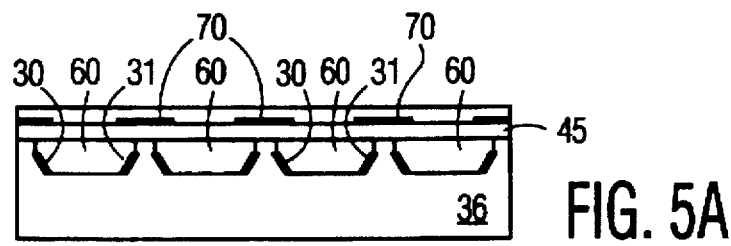
FIG. 5A is a schematic side view of part of a channel plate showing one form of arrangement of black masking in accordance with a feature of the invention.
Figure 5B:
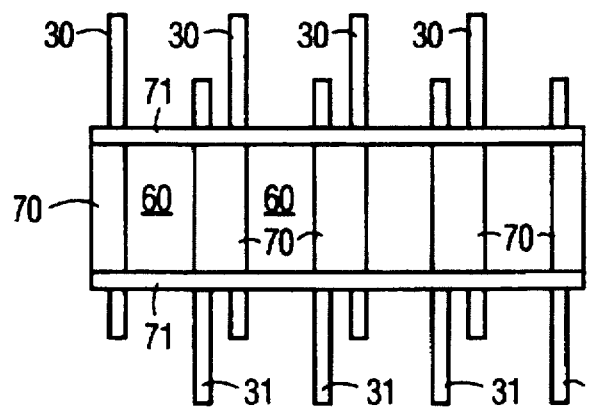
FIG. 5B is a schematic top view of the part of the channel plate shown in FIG. 5A.

FIGS. 5A and 5B illustrate the arrangement of the black masking 70 for several adjacent channels 60, with FIG. 5A being a sectional view and FIG. 5B a top view of just the electrodes 30, 31 and masking 70. FIG. 5B also shows the black masking stripes 71 used to define one row of pixels.

The optically used part of the bottom of the channel, which includes the flat part 64 and the adjacent curved parts 68 up to the edge of the electrodes 30, 31, nearly is flat, and hardly any light depolarization will occur there. As the metal lines 30, 31 are now facing each other under an angle of about 90°, the height h of the channel can be lower than in the case of metal lines lying on a flat surface, though higher than in the configuration where the electrodes are on side walls that extend perpendicular to the bottom. The necessary height h in this case will be about 50% of the spacing d. This leads to h=100 μm for the example given above.

The invention is not limited to the specific example given above. In general, with a desired pitch p as the given, and b representing the width of the ridge formed by the side walls between adjacent channels, and φ being the angle that the electrode surface 66 makes with the flat bottom part 64, the preferred ranges of the other values are as follows:

(i) 0.03 p≦b≦0.1 p
(ii) 0.28 p≦h≦0.34 p
(iii) 0.1 p≦w≦0.25 p
(iv) 0.6 p≦d≦0.75 p
(v) 40°≦φ≦60°
(vi) 0.22 p≦c≦0.41 p With the parameter b in the range stated above, an advantage is that less space is wasted by the resulting thin channel ridges. As indicated above, with the parameter h in the range stated above, an advantage is that the etching time for the channels is reduced. With the parameters c and d in the ranges stated above, the advantages are that the aperture is increased, less depolarization occurs, and increased light output amd contrast results. With the parameter φ in the range stated above, the advantage is that the channel height can be reduced. With the parameter w in the range stated above, an advantage is that the a stable discharge is possible.

Several preferred examples are (all values except the angle are in μm):

(1) for p=312, φ=60°, b=20, d=215, h=90, w=50, and c=112;

(2) for p=500, φ=40°, b=50, d=304, h=160, w=78, and c=130.

The flatness of the bottom part 64 preferably is within a tolerance of ±1% over the short range and within ±5% over the long range (approximately the length of the channel or the size of the panel), as a percentage of the height h. The surface may be optically flat and change smoothly as a result of the normal wet etching process for etching the channels in the glass substrate 36.

All of the methods described in the referenced patents and publication will be suitable for making the channels and electrodes for the panel of the invention. A preferred method for etching the channels 60 with the flat bottomed part 64 and curved side walls as illustrated in FIG. 4 is to use a standard wet etching technique with wide mask openings generally positioned over where the flat bottom parts 64 are to be located, and etching down to the depth h.

The electrodes 30, 31 are typically formed by vapor depositing a film of the electrode material over the entire channel plate, spraying or spinning a suitable etch resist over the vapor-deposited electrode layer, exposing the resist through a mask in a conventional proximity printing technique, developing the resist, and finally etching of the exposed electrode metal and striping of the resist remainders. Typically, the exposure was done vertically with the light rays projected perpendicularly to the chanel plate. The known process is not very suitable for the channel configurations illustrated in FIGS. 3 and 4, because of the location of the electrodes up on the curved side walls.

In accordance with another feature of the invention, the exposure of the resist is done under an angle of about 45° in one direction to expose one side of the resist and then the mask is rotated 180° with respect to the table and then the other side of the resist is exposed at an angle of about 45° in the other direction. While this in its simplest form requires two exposures in two different directions, it has the important advantage of requiring only one mask and thus avoids mask alignment problems.

Figure 6A:
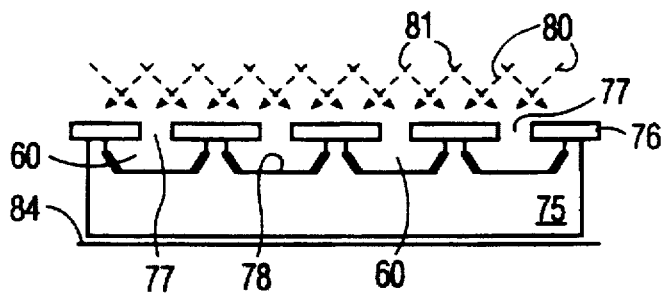
FIG. 6A is a schematic side view of part of a channel plate showing how the resist can be exposed in one form of the method for making the electrodes in accordance with a feature of the invention.
Figure 6B:
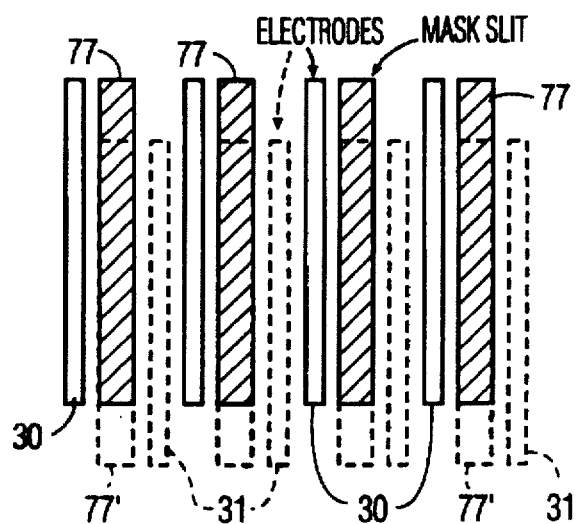
FIG. 6B is a schematic top view of the part of the channel plate shown in FIG. 5A showing the relationship of the resultant electrodes to the mask used to expose the resist.

FIGS. 6A shows a channel plate 75 with several channels 60, and an exposure mask 76 with slits 77 for the radiation to reach the resist covered electrode film 78. The arrows 80, 81 show the two substantially 45° directions of incidence of the exposing radiation beam before and after rotation of the mask in the plane of the mask. For example, in practice, first one side of the channels would be exposed with beam 80, and the mask rotated and the resist exposed with beam 81. When the mask 76 is rotated then the position of the channels with respect to the mask slits 77 changes from the solid lines 77 shown in FIG. 6B to the dashed lines 77'. FIG. 6B illustrates the location of the anode electrodes 30 and cathode electrodes 31 with respect to the mask slits 77 and demonstrates how the single mask with slits 77 can be used to form both electrodes with elongated ends offset with respect to one another for making connections thereto.

The invention can be used in all kinds of PALC displays that typically have a small channel pitch for use in computer monitors, workstations or TV applications.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A plasma-addressed display device comprising a layer of electro-optic material, data electrodes coupled to the electro-optic layer and adapted to receive data voltages for activating portions of the electro-optic layer, and a plurality of elongated plasma channels extending generally transverse to the data electrodes for selectively switching on said electro-optic portions, said plasma channels each comprising a bottom surface portion and flanking side wall surface portions and spaced cathode and anode plasma electrodes on surface portions of the channel and an ionizable gas filling, each channel configured to have a substantially flat bottom surface portion flanked by curved or angled side wall surface portions with the cathode and anode electrodes positioned on the side wall surface portions, characterized in that the electrode surfaces form an angle of about 90 degrees with each other.

2. The device of claim 1, characterized in that the channel has a height such that a stable discharge results when the gas is ionized.

3. The device of claim 1, characterized in that each channel has a cross-section comprising a substantially flat bottom portion having a width c, curved or angled sides flanking the flat bottom portion and rising to a height b forming ridges between adjacent plasma channels of a width b, adjacent plasma channels having a pitch p, said plasma electrodes each having a width w and being spaced by a width d, the values of b and p being such that:

(i) $0.03\ p \leq b \leq 0.1\ p$.

4. The device of claim 1, characterized in that each channel has a cross-section comprising a substantially flat bottom portion having a width c, curved or angled sides flanking the flat bottom portion and rising to a height h forming ridges between adjacent plasma channels of a width b, adjacent plasma channels having a pitch p, said plasma electrodes each having a width w and being spaced by a width d, the values of h and p being such that:

(i) $0.28\ p \leq h \leq 0.34\ p$.

5. The device of claim 1, characterized in that each channel has a cross-section comprising a substantially flat bottom portion having a width c, curved or angled sides flanking the flat bottom portion and rising to a height h forming ridges between adjacent plasma channels of a width b, adjacent plasma channels having a pitch p, said plasma electrodes each having a width w and being spaced by a width d, the values of p and w being such that:

(i) $0.1\ p \leq w \leq 0.25\ p$.

6. The device of claim 1, characterized in that each channel has a cross-section comprising a substantially flat bottom portion having a width c, curved or angled sides flanking the flat bottom portion and rising to a height h forming ridges between adjacent plasma channels of a width b, adjacent plasma channels having a pitch p, said plasma electrodes each having a width w and being spaced by a width d, the values of p and d being such that:

(i) $0.6\ p \leq d \leq 0.75\ p$.

7. The device of claim 1, characterized in that each of the electrode surfaces form an angle $\phi$ with the flat bottom surface portion in the range of 40°–60°.

8. The device of claim 7, characterized in that the value of c is such that:

(i) $0.22\ p \leq c \leq 0.41\ p$.

9. The device of claim 8, characterized in that the flat surface portion is flat over the length of the channel to a tolerance of ±5% of the height h.

10. The device of claim 1, characterized in that black masking is provided so as to overlie at least a portion of the curved or angled side wall surface portions of the channels.

11. The device of claim 10, characterized in that the black masking extends over the tops of the side walls and the electrodes.

12. A plasma-addressed display device comprising a layer of electro-optic material, data electrodes coupled to the electro-optic layer and adapted to receive data voltages for activating portions of the electro-optic layer, and a plurality of elongated plasma channels extending generally transverse to the data electrodes for selectively switching on said electro-optic portions, said plasma channels each comprising a bottom surface portion and flanking side wall surface portions forming interchannel ridges and spaced cathode and anode plasma electrodes on surface portions of the channel and an ionizable gas filling, characterized in that each channel is configured to have a substantially flat bottom surface portion flanked by curved or angled side wall surface portions with the cathode and anode electrodes positioned on the side wall surface portions and black masking is located in such a position so as to screen out light being incident on the curved or angled side wall surface portions and ridges and further characterized in that the electrode surfaces form an angle of about 90 degrees with each other.

13. In a method of making a plasma-addressed display device comprising a layer of electro-optic material, data electrodes coupled to the electro-optic layer and adapted to receive data voltages for activating portions of the electro-optic layer, and a plurality of elongated plasma channels extending generally transverse to the data electrodes for selectively switching on said electro-optic portions, said plasma channels each comprising a bottom surface portion and flanking side wall surface portions and spaced cathode and anode plasma electrodes on surface portions of the channel and an ionizable gas filling, with each channel is configured to have a substantially flat bottom surface portion flanked by curved or angled side wall surface portions with the cathode and anode electrodes positioned on the side wall portions, characterized in that the electrodes are formed on the side wall surface portions by:

(a) depositing a film of electrode material covering the plasma channels, (b) depositing a resist layer over the electrode film, (c) providing a mask with radiation transparent openings over the plasma channels, (d) exposing the resist layer with a radiation beam from a first substantially 45° direction, (e) exposing the resist layer with a radiation beam from a second substantially 45° direction, (f) processing the resist layer to remove the non-radiated parts and etching the film to remove the parts not protected by the resist parts remaining.

14. The method of claim 13, characterized in that between steps (d) and (e) the mask is rotated 180° in its plane.

* * * * *